(12) United States Patent
Wang et al.

(10) Patent No.: US 9,205,407 B2
(45) Date of Patent: Dec. 8, 2015

(54) METHOD FOR PREPARING AMORPHOUS IRON OXIDE HYDROXIDE

(75) Inventors: Lixian Wang, Beijing (CN); Zhenyi Liu, Beijing (CN)

(73) Assignee: BEIJING SJ ENVIRONMENTAL PROTECTION AND NEW MATERIAL CO., LTD., Beijing (CN)

( * ) Notice: Subject to any disclaimer, the term of this patent is extended or adjusted under 35 U.S.C. 154(b) by 0 days.

(21) Appl. No.: 14/369,612

(22) PCT Filed: May 21, 2012

(86) PCT No.: PCT/CN2012/075834
§ 371 (c)(1),
(2), (4) Date: Jun. 27, 2014

(87) PCT Pub. No.: WO2013/097405
PCT Pub. Date: Jul. 4, 2013

(65) Prior Publication Data
US 2015/0010465 A1    Jan. 8, 2015

(30) Foreign Application Priority Data
Dec. 29, 2011   (CN) .......................... 2011 1 0450757

(51) Int. Cl.
*C01G 49/02* (2006.01)
*B01J 20/30* (2006.01)

(52) U.S. Cl.
CPC ............. *B01J 20/3085* (2013.01); *C01G 49/02* (2013.01); *C01P 2002/02* (2013.01); *C01P 2006/80* (2013.01)

(58) Field of Classification Search
None
See application file for complete search history.

(56) References Cited

U.S. PATENT DOCUMENTS

| 2008/0241055 | A1 | 10/2008 | Kawase et al. | |
| 2011/0256039 | A1 | 10/2011 | Liu et al. | |
| 2011/0256044 | A1* | 10/2011 | Liu et al. | 423/234 |
| 2011/0260102 | A1 | 10/2011 | Liu et al. | |
| 2011/0260103 | A1 | 10/2011 | Liu et al. | |

FOREIGN PATENT DOCUMENTS

| CN | 101274781 A | 10/2008 |
| CN | 101767776 A | 7/2010 |
| CN | 101767829 A | 7/2010 |
| CN | 101767830 A | 7/2010 |
| CN | 101767831 A | 7/2010 |
| CN | 101898112 A | 12/2010 |

OTHER PUBLICATIONS

Gong Zhi-jian, et al., Coal Science and Technology, vol. 34 No. 10 (Oct. 2006), "Research on Desulfurization Activity of Iron Oxyhydroxide Prepared with Different Alkali Ratios" (with English language translation).
National Information Center of Gas Purification, Proceedings on Technical Seminar, 2010, "Preparation and property evaluation of ambient temperature desulfurizer iron oxide hydroxide" (Oct. 2, 2010)(pp. 68-71) with English language translation.

\* cited by examiner

*Primary Examiner* — Steven Bos
(74) *Attorney, Agent, or Firm* — Birch, Stewart, Kolasch & Birch, LLP

(57) ABSTRACT

A method for preparing amorphous iron oxide hydroxide, comprising following steps: (1) preparing a ferrous salt solution with solid soluble ferrous salt; (2) preparing a hydroxide solution; (3) mixing said hydroxide solution and said ferrous salt solution in a co-current manner for reaction at an alkali ratio of 0.6~0.8 and a reaction temperature not exceeding 30° C.; (4) after the reaction in step (3) is finished, yielding a first mixture, then charging said first mixture with a gas containing oxygen for oxidation, and controlling the first mixture at a pH value of 6~8 until the oxidation is finished to yield a second mixture; and (5) filtering, washing with water and drying said second mixture obtained in step (4) to yield the amorphous iron oxide hydroxide.

20 Claims, No Drawings

METHOD FOR PREPARING AMORPHOUS IRON OXIDE HYDROXIDE

TECHNICAL FIELD

The present invention relates to method for preparing amorphous iron oxide hydroxide, belonging to a technical field of desulfurization.

BACKGROUND OF THE INVENTION

Among various types of iron oxide hydroxide (FeOOH) with different crystalline states, amorphous iron oxide hydroxide is an initial state for crystalline iron oxide hydroxide ($\alpha$, $\beta$, or $\gamma$-FeOOH), and has a crystalline aggregate smaller than 5 nm, and the structure is ordered in short range and disordered in long range. Such a structure allows amorphous iron oxide hydroxide to have relatively high desulfurization activity.

The applicant has been committed to desulfurization property study of amorphous iron oxide hydroxide and has published an article titled "Preparation and property evaluation of ambient temperature desulfurizer iron oxide hydroxide" (referring to pages 68-71, National Information Center of Gas Purification, Proceedings on Technical Seminar, 2010). This article discloses a laboratory preparation thought of amorphous iron oxide hydroxide, and verifies the desulfurization and regeneration mechanism of the amorphous iron oxide hydroxide through experimental data. However, this study is still at the laboratory exploration stage, and the final objective of this study is to achieve a mass production of amorphous iron oxide hydroxide with high purity and high sulfur capacity in industrial production.

However, so far, amorphous iron oxide hydroxide desulfurizer is not commonly used in practice. The so-called amorphous iron oxide hydroxide desulfurizers sold in the market have poor desulfurization property and are difficult to be regenerated due to low purity of amorphous iron oxide hydroxide (lower than 40%) and high content of other non-regenerative iron oxides (ferroferric oxide, ferric oxide or iron oxide hydroxide in other crystalline states).

In prior art, a reference titled "Research on desulfurization activity of iron oxyhydroxide prepared with different alkali ratios" was published on Coal Science and Technology, Vol. 34 No. 10, October of 2006. This reference provides a preparation method of amorphous iron oxide hydroxide, which comprises following steps: A certain amount of distilled water and ferrous salt are added into a reactor and stirred, and nitrogen is passed into the reactor for protection. After the ferrous salt is dissolved, according to an alkali ratio of 1, a certain amount of alkali solution is dropped into. After the alkali solution dropping is finished, nitrogen is replaced with air for oxidation reaction, and when the conversion rate of $[Fe^{3+}]/[\Sigma Fe]$ reaches 100% and when the color of the solution observed by paper chromatography does not change further, the oxidation reaction is finished. The sample is washed to remove $Na^+$ contained therein, obtaining a filter cake of amorphous iron oxide hydroxide. The amorphous iron oxide hydroxide prepared under the above mentioned conditions has low purity, and contains a large amount of iron oxides and iron oxide hydroxide in other crystalline states, which results in low purity, low sulfur capacity and non-regenerative characteristic when the generated amorphous iron oxide hydroxide is used as a desulfurizer. The reasons for these problems are that, the preparation of amorphous iron oxide hydroxide is strongly influenced by preparation conditions such as pH value, temperature, feeding speed and so on, and small changes on preparation conditions will result in big difference on contents of amorphous iron oxide hydroxide, iron oxides and iron oxide hydroxide in other crystalline states. Therefore, it is very difficult to explore preparation conditions which allow preparation of amorphous iron oxide hydroxide with high purity and high sulfur capacity.

The preparation method of amorphous iron oxide hydroxide disclosed by the above mentioned reference is also a laboratory method, which needs nitrogen protection and has a complex preparation process and a high production cost, so is not applicable to industrial production.

SUMMARY OF THE INVENTION

In order to solve the problems that the preparation method of amorphous iron oxide hydroxide in prior art is not applicable to industrial production, and that the obtained amorphous iron oxide hydroxide has low purity and contains a large amount of iron oxides and iron oxide hydroxide in other crystalline states, which results in low purity, low sulfur capacity and non-regenerative characteristic when the obtained amorphous iron oxide hydroxide is used as a desulfurizer, the present invention provides a method for preparing amorphous iron oxide hydroxide, and the method is applicable to industrial production and can produce amorphous iron oxide hydroxide which has a high purity and a high sulfur capacity and is regenerative.

The technical solution of the method for preparing amorphous iron oxide hydroxide of the present invention is described as below.

A method for preparing amorphous iron oxide hydroxide, comprising following steps:
(1) preparing a ferrous salt solution with solid soluble ferrous salt;
(2) preparing a hydroxide solution;
(3) mixing said hydroxide solution and said ferrous salt solution in a co-current manner for reaction, controlling said hydroxide solution and said ferrous salt solution at an alkali ratio (which refers to a ratio of the equivalent concentration of the hydroxide solution to the equivalent concentration of the ferrous salt solution) of 0.6~0.8 and controlling a reaction temperature not exceeding 30° C.;
(4) after the reaction in step (3) is finished, yielding a first mixture, charging the first mixture with a gas containing oxygen for oxidation, and controlling the first mixture at a pH value of 6~8 until the oxidation is finished to yield a second mixture; and
(5) filtering, washing with water and drying said second mixture obtained in step (4) to yield the amorphous iron oxide hydroxide.

In a class of this embodiment, said hydroxide is a hydroxide of group IA or group IIA elements.

In a class of this embodiment, said ferrous salt solution has a concentration of 1.3-1.8 mol/L, and said hydroxide solution has a concentration of 4-6 mol/L.

In a class of this embodiment, in step (4), a hydroxide solution is used to control the first mixture at a pH value of 6~8.

In a class of this embodiment, in step (4), the hydroxide solution has a concentration of 4-6 mol/L and a feeding speed of 10-20 ml/min.

In a class of this embodiment, in step (3), said ferrous salt solution has a feeding speed controlled at 200-300 ml/min, and said hydroxide solution has a feeding speed controlled at 50-60 ml/min.

In a class of this embodiment, the alkali ratio of the hydroxide solution added in steps (3) and (4) and said ferrous salt solution is 1.05-1.25.

In a class of this embodiment, in step (5), said drying is carried out at a temperature not exceeding 90° C.

In a class of this embodiment, in step (4), water is added into the first mixture before charging the first mixture with a gas containing oxygen for oxidation.

In a class of this embodiment, in step (4), the oxidation lasts for 10-15 h.

In a class of this embodiment, in step (4), the gas containing oxygen is air, and the introduction amount of air is not less than 700 L/h.

As a whole, the method for preparing amorphous iron oxide hydroxide of the present invention includes two stages.

In a first stage, $Fe^{2+}$ precipitates to generate $Fe(OH)_2$, and in a second stage, $Fe(OH)_2$ is oxidized by air to generate FeOOH. After research the applicant finds that, the particle size and generation environment of $Fe(OH)_2$ particles before oxidation will affect the purity and property of the amorphous iron oxide hydroxide obtained. Therefore, there are two key factors in the first stage: the first factor is the reaction temperature, and the second factor is the alkali ratio of the hydroxide solution added and the ferrous salt solution added, because the value of alkali ratio will directly affect the particle size of the $Fe(OH)_2$ particles and the pH value of the solution. Through countless experiments and studies, the applicant of the present invention finds that feeding by controlling the alkali ratio of the hydroxide solution and the ferrous salt solution at 0.6-0.8 and controlling the reaction temperature not exceeding 30° C. can facilitate the generation of amorphous iron oxide hydroxide with high purity.

During the oxidation in the second stage, firstly, nucleation of FeOOH occurs on the surface of $Fe(OH)_2$ particles, and during the nucleation process, $Fe^{2+}$ will react to generate green rust having a chemical composition $[Fe_4Fe_2(OH)_{12}] \cdot [SO_4 \cdot 2H_2O]$. Green rust is an unstable compound, and may be oxidized into $\alpha$, $\beta$, or $\gamma$-FeOOH, or amorphous iron oxide hydroxide, or $Fe_3O_4$ depending on oxidation speed, pH value and temperature. After study the applicant finds that controlling the conditions of the oxidation process can further promote the generation of amorphous iron oxide hydroxide. In detail, firstly, the pH value is adjusted to a range of 6-8, which can allow fast oxidation of $Fe(OH)_2$ and further facilitate the generation of amorphous FeOOH; if the pH value is too high, ferrite products such as $Fe_3O_4$ and $Na_2Fe_2O_4$ will be generated. Therefore, in the method of the present invention, the pH value is controlled at 6~8, which effectively improves the purity of amorphous FeOOH. Secondly, the reaction temperature is controlled not exceeding 30° C., because if the reaction temperature is too high, iron black will be easily generated.

Furthermore, in the method for preparing amorphous iron oxide hydroxide of the present invention, the concentration of the ferrous salt solution is controlled to be 1.3-1.8 mol/L, and the concentration of the hydroxide solution is controlled to be 4-6 mol/L; and the feeding speed of the ferrous salt solution is controlled to be 200-300 ml/min, and the feeding speed of the hydroxide solution is controlled to be 90-100 ml/min. Control of the concentration and feeding speed of the ferrous salt solution and the hydroxide solution can allow the alkali ratio of the raw materials to be maintained within a proper range. Here, the control of the feeding speed of the hydroxide solution is particularly important. Through research the inventors find that, if the feeding speed of the hydroxide solution is too fast, iron black will be easily generated by the reaction of the reactants, thus affecting the purity of the amorphous iron oxide hydroxide. In order to control the feeding speed of the hydroxide solution during the oxidation process, the present invention further defines that in step (4), the concentration of the hydroxide solution is 4-6 mol/L, and the feeding speed of the hydroxide solution is 10-20 ml/min.

The method for preparing amorphous iron oxide hydroxide of the present invention has following advantages:
(1) The method for preparing amorphous iron oxide hydroxide is simple and may be applicable to industrial mass production.
(2) The amorphous iron oxide hydroxide produced by the method has a high purity which can reach 90-100%, and barely contain iron oxides and iron oxide hydroxide in other crystalline states, and therefore allows high sulfur capacity and regeneration when it is used as a desulfurizer.

DETAILED DESCRIPTION OF EMBODIMENTS

In order to make the present invention more easily and clearly understood, detailed description of the method for preparing amorphous iron oxide hydroxide is further presented below with reference of detailed embodiments.

Example 1

The method for preparing amorphous iron oxide hydroxide in this example comprises following steps:
(1) 186.3 g solid $FeSO_4 \cdot 7H_2O$ is prepared into an aqueous solution having a concentration of 1.34 mol/L, and is placed in a beaker;
(2) 56.3 g solid NaOH is weighed out and is prepared into an aqueous solution having a concentration of 4.5 mol/L, and is placed in a beaker;
(3) the hydroxide solution and the ferrous salt solution are mixed in a co-current manner for reaction, wherein the alkali ratio of above reactants is 0.6 and the reaction temperature is controlled at 30° C., with controlling the ferrous salt solution at a feeding speed of 256 ml/min and the NaOH solution at a feeding speed of 91.5 ml/min;
(4) after the reaction in step (3) is finished, yielding a first mixture, 200 ml water is added into the first mixture, then blast pump is started to charge air into the first mixture for oxidation for about 10 hours with a introduction amount of air controlled at 700 L/h; and during the oxidation process, the pH value of the first mixture is controlled within a range of $6 \leq pH \leq 8$, and when the pH value is lower than 6, the NaOH solution is added supplementarily at a feeding speed of 15 ml/min until the pH value reaches about 7.8; and the oxidation is deemed to be finished when the molar ratio of $Fe^{2+}/Fe_t$ is less than 1%, yielding a second mixture;

In this example, the alkali ratio of the hydroxide solution added in steps (3) and (4) totally and the ferrous salt solution is 1.05;
(5) the second mixture obtained in step (4) is filtered and washed with water until the content of $Na^+$ in obtained filter cake is less than 0.5%, and then is dried at 90° C. to yield the amorphous iron oxide hydroxide.

Example 2

The method for preparing amorphous iron oxide hydroxide in this example comprises following steps:
(1) 250.3 g solid $FeSO_4 \cdot 7H_2O$ is prepared into an aqueous solution having a concentration of 1.8 mol/L, and is placed in a beaker;

(2) 90 g solid NaOH is weighed out and is prepared into an aqueous solution having a concentration of 4 mol/L, and is placed in a beaker;
(3) the hydroxide solution and the ferrous salt solution are mixed in a co-current manner for reaction, wherein the alkali ratio of above reactants is 0.8 and the reaction temperature is 10° C., with controlling the ferrous salt solution at a feeding speed of 300 ml/min and the NaOH solution at a feeding speed of 216 ml/min;
(4) after the reaction in step (3) is finished, yielding a first mixture, 200 ml water is added into the first mixture, then blast pump is started to charge air into the first mixture for oxidation for about 10 hours with a introduction amount of air at 700 L/h; and during the oxidation process, the pH value of the first mixture is controlled within a range of 6≤pH≤8, and when the pH value is lower than 6, the NaOH solution is added supplementarily at a feeding speed of 15 ml/min until the pH value reaches about 7.8; and the oxidation is deemed to be finished when the molar ratio of $Fe^{2+}/Fe_t$ is less than 1%, yielding a second mixture;

In this example, the alkali ratio of the hydroxide solution added in steps (3) and (4) totally and the ferrous salt solution is 1.25;

(5) the second mixture obtained in step (4) is filtered and washed with water until the content of $Na^+$ in obtained filter cake is less than 0.5%, and then is dried at 90° C. to yield the amorphous iron oxide hydroxide.

Example 3

The method for preparing amorphous iron oxide hydroxide in this example comprises following steps:
(1) 250.3 g solid $FeSO_4 \cdot 7H_2O$ is prepared into an aqueous solution having a concentration of 1.8 mol/L, and is placed in a beaker;
(2) 75 g solid NaOH is weighed out and is prepared into an aqueous solution having a concentration of 6 mol/L, and is placed in a beaker;
(3) the hydroxide solution and the ferrous salt solution are mixed in a co-current manner for reaction, wherein the alkali ratio of above reactants is 0.69 and the reaction temperature is controlled at 20° C., with controlling the ferrous salt solution at a feeding speed of 120 ml/min and the NaOH solution at a feeding speed of 50 ml/min;
(4) after the reaction in step (3) is finished, yielding a first mixture, 150 ml water is added into the first mixture, then blast pump is started to charge air into the first mixture for oxidation for about 10 hours with an introduction amount of air controlled at 700 L/h; and during the oxidation process, the pH value of the first mixture is controlled within a range of 6≤pH≤8, and when the pH value is lower than 6, the NaOH solution is added supplementarily at a feeding speed of 15 ml/min until the pH value reaches about 7.8; and the oxidation is deemed to be finished when the molar ratio of $Fe^{2+}/Fe_t$ is less than 1%, yielding a second mixture;

In this example, the alkali ratio of the hydroxide solution added in steps (3) and (4) totally and the ferrous salt solution is 1.05;

(5) the second mixture obtained in step (4) is filtered and washed with water until the content of $Na^+$ in obtained filter cake is less than 0.5%, and then is dried at 90° C. to yield the amorphous iron oxide hydroxide.

Example 4

The method for preparing amorphous iron oxide hydroxide in this example comprises following steps:
(1) 180.7 g solid $FeSO_4 \cdot 7H_2O$ is prepared into an aqueous solution having a concentration of 1.3 mol/L, and is placed in a beaker;
(2) 60 g solid NaOH is weighed out and is prepared into an aqueous solution having a concentration of 6 mol/L, and is placed in a beaker;
(3) the hydroxide solution and the ferrous salt solution are mixed in a co-current manner for reaction, wherein the alkali ratio of above reactants is 0.69 and the reaction temperature is controlled at 25° C., with controlling the ferrous salt solution at a feeding speed of 200 ml/min and the NaOH solution at a feeding speed of 60 ml/min;
(4) after the reaction in step (3) is finished, yielding a first mixture, 200 ml water is added into the first mixture, then blast pump is started to charge air into the first mixture for oxidation for about 15 hours with an introduction amount of air controlled at 720 L/h; and during the oxidation process, the pH value of the first mixture is controlled within a range of 6≤pH≤8, and when the pH value is lower than 6, the NaOH solution is added supplementarily at a feeding speed of 10 ml/min until the pH value reaches about 7.8; and the oxidation is deemed to be finished when the molar ratio of $Fe^{2+}/Fe_t$ is less than 1%, yielding a second mixture;

In this example, the alkali ratio of the hydroxide solution added in steps (3) and (4) totally and the ferrous salt solution is 1.15;

(5) the second mixture obtained in step (4) is filtered and washed with water until the content of $Na^+$ in a filter cake is less than 0.5%, and then is dried at 80° C. to yield the amorphous iron oxide hydroxide.

Example 5

The method for preparing amorphous iron oxide hydroxide in this example comprises following steps:
(1) 208.5 g solid $FeSO_4 \cdot 7H_2O$ is prepared into an aqueous solution having a concentration of 1.5 mol/L, and is placed in a beaker;
(2) 75 g solid NaOH is weighed out and is prepared into an aqueous solution having a concentration of 6 mol/L, and is placed in a beaker;
(3) the hydroxide solution and the ferrous salt solution are mixed in a co-current manner for reaction, wherein the alkali ratio of above reactants is 0.6 and the reaction temperature is controlled at 20° C., with controlling the ferrous salt solution at a feeding speed of 200 ml/min and the NaOH solution at a feeding speed of 60 ml/min;
(4) after the reaction in step (3) is finished, yielding a first mixture, 100 ml water is added into the first mixture, then blast pump is started to charge air into the first mixture for oxidation for about 15 hours with an introduction amount of air controlled at 720 L/h; and during the oxidation process, the pH value of the first mixture is controlled within a range of 6≤pH≤8, and when the pH value is lower than 6, the NaOH solution is added supplementarily at a feeding speed of 15 ml/min until the pH value reaches about 7.8; and the oxidation is deemed to be finished when the molar ratio of $Fe^{2+}/Fe_t$ is less than 1%, yielding a second mixture;

Alternatively, a solution of bicarbonate such as sodium bicarbonate can be added supplementarily for adjusting the pH value during the oxidation process;

In this example, the alkali ratio of the hydroxide solution added in steps (3) and (4) totally and the ferrous salt solution is 1.25;

(5) the second mixture obtained in step (4) is filtered and washed with water until the content of $Na^+$ in obtained filter cake is less than 0.5%, and then is dried at 70° C. to yield the amorphous iron oxide hydroxide.

In the above examples, $Fe_t$ is the total content of Ferrum element. $Fe^{2+}/Fe_t$ was determined through potassium dichromate titration method. The content of $Na^+$ was determined through flame spectrometry.

In addition, in step (3) of the present invention, the hydroxide solution and the ferrous salt solution are mixed in a co-current manner for reaction. The term "co-current" means that the hydroxide solution and the ferrous salt solution are respectively fed into a reactor via two pipes at the same time for mixing. The term "same time" means that the feeding of the hydroxide solution and the feeding of the ferrous salt solution are started at the same time, and are finished at a same time.

While particular embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

The invention claimed is:

1. A method for preparing amorphous iron oxide hydroxide which comprises following steps:
    preparing a ferrous salt solution with a solid, soluble ferrous salt,
    preparing a hydroxide solution,
    forming a first mixture by mixing and reacting the hydroxide solution and the ferrous salt solution in a co-current manner by controlling the ferrous salt solution feeding speed to 200-300 ml/min. and the hydroxide solution feeding speed to 50-60 ml/min.; by controlling the reaction temperature to not more than 30° C. and by controlling the alkali ratio of the hydroxide solution and the ferrous salt solution to 0.6 to 0.8,
    oxidizing the first mixture with an oxygen-containing gas at a pH of 6-8 to yield a second mixture, and
    filtering, washing with water and drying said second mixture to obtain the amorphous iron oxide hydroxide.

2. The method of claim 1, wherein the hydroxide is a hydroxide of group IA or group IIA elements.

3. The method of claim 2, wherein the ferrous salt solution has a concentration of 1.3-1.8 mol/L, and the hydroxide solution has a concentration of 4-6 mol/L.

4. The method of claim 2, wherein the drying is carried out at a temperature not exceeding 90° C.

5. The method of claim 2, wherein water is added to the first mixture before oxidizing the first mixture with the oxygen-containing gas.

6. The method of claim 1, wherein the ferrous salt solution has a concentration of 1.3-1.8 mol/L, and the hydroxide solution has a concentration of 4-6 mol/L.

7. The method of claim 1, wherein the pH of 6-8 is achieved by adding a further amount of hydroxide solution.

8. The method of claim 7, wherein the further amount of hydroxide solution has a concentration of 4-6 mol/L and a feeding speed of 10-20 ml/min.

9. The method of claim 7, wherein the alkali ratio of the hydroxide solution, including that mixed with the ferrous salt solution and that added for achieving the pH of 6-8, to the ferrous salt solution is 1.05-1.25.

10. The method of claim 7, wherein the drying is carried out at a temperature not exceeding 90° C.

11. The method of claim 7, wherein water is added to the first mixture before oxidizing the first mixture with the oxygen-containing gas.

12. The method of claim 8, wherein the alkali ratio of the hydroxide solution including that mixed with the ferrous salt solution and that added for achieving the pH of 6-8, to the ferrous salt solution is 1.05-1.25.

13. The method of claim 8, wherein the drying is carried out at a temperature not exceeding 90° C.

14. The method of claim 9, wherein the oxidizing is conducted for 10-15 h.

15. The method of claim 9, wherein the drying is carried out at a temperature not exceeding 90° C.

16. The method of claim 1, wherein the drying is carried out at a temperature not exceeding 90° C.

17. The method of claim 1, wherein water is added to the first mixture before oxidizing the first mixture with the oxygen-containing gas.

18. The method of claim 1, wherein the oxygen containing gas is air, and the air is added in an amount of not less than 700 L/h.

19. The method of claim 12, wherein the drying is carried out at a temperature not exceeding 90° C.

20. The method of claim 12, wherein the oxidation is conducted for 10-15 h.

* * * * *